June 2, 1931. L. DE FLOREZ 1,808,343
METHOD OF HEATING OILS
Original Filed July 2, 1926 2 Sheets-Sheet 1
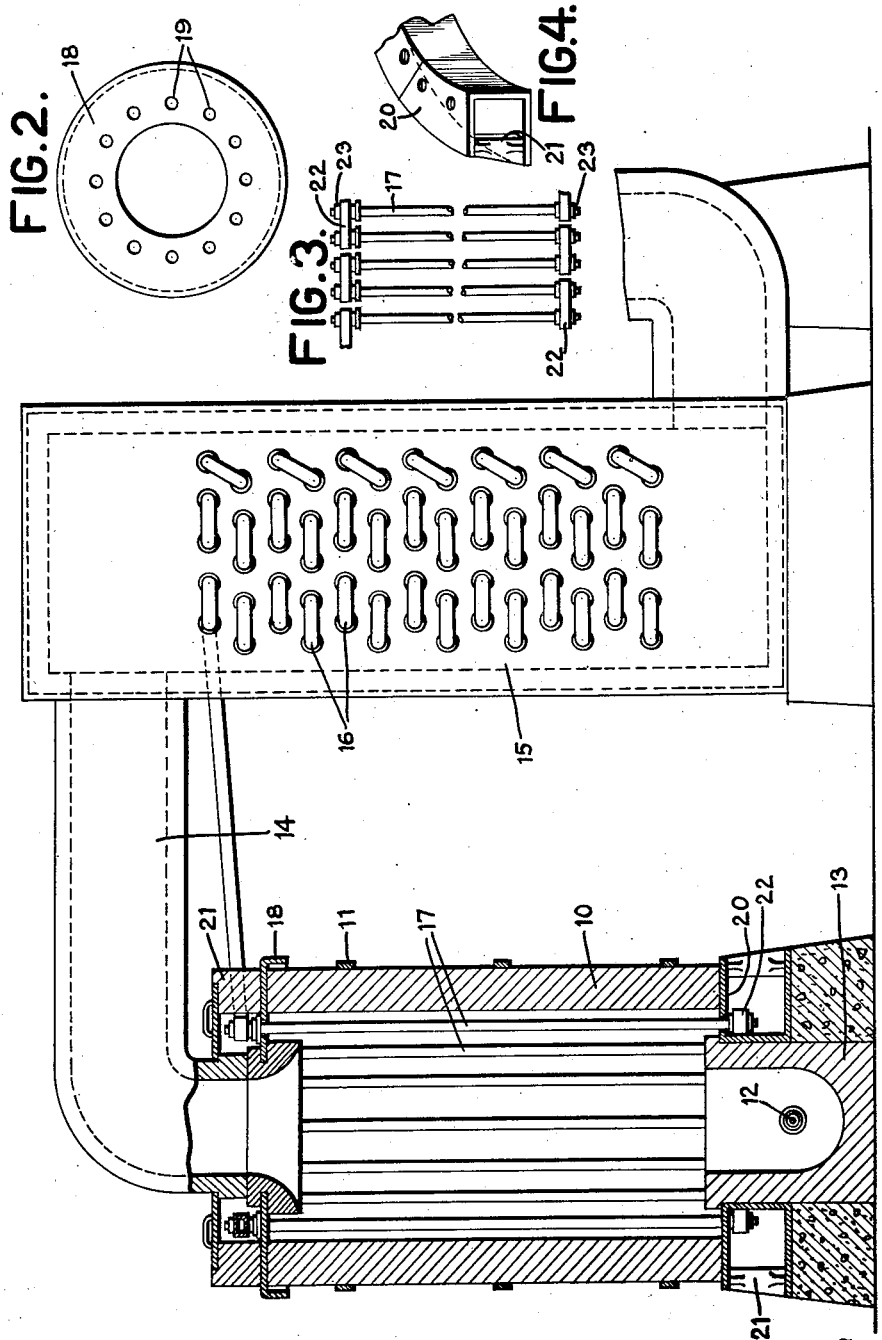
Inventor
Luis de Florez
By his Attorney
R. J. Dearborn June 2, 1931.                L. DE FLOREZ                1,808,343
METHOD OF HEATING OILS
Original Filed July 2, 1926    2 Sheets-Sheet 2
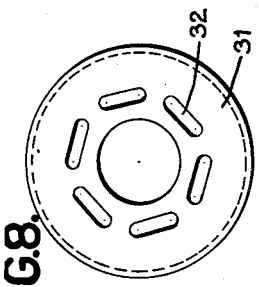
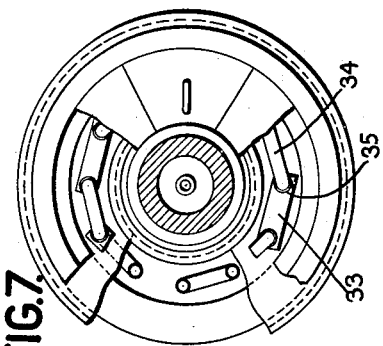
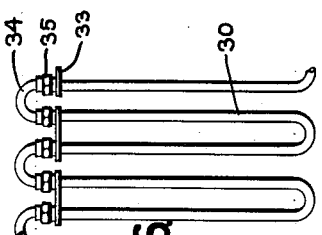
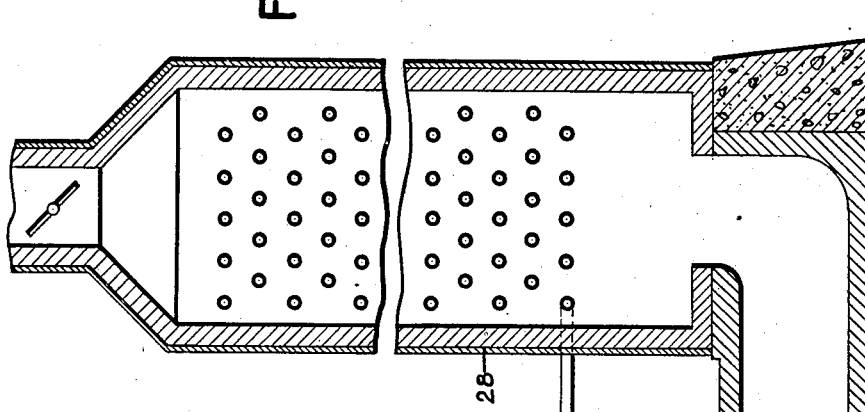
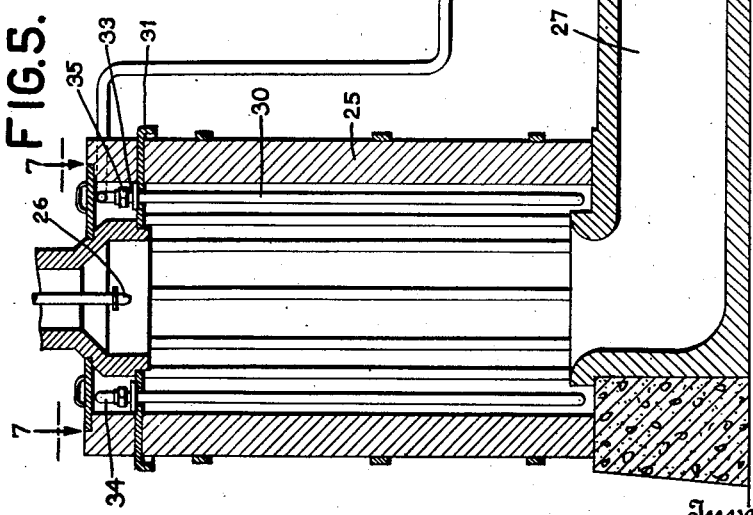
Inventor
Luis de Florez
By his Attorney
R. J. Dearborn Patented June 2, 1931

1,808,343

UNITED STATES PATENT OFFICE

LUIS DE FLOREZ, OF POMFRET, CONNECTICUT, ASSIGNOR TO THE TEXAS COMPANY, OF NEW YORK, N. Y., A CORPORATION OF DELAWARE

METHOD OF HEATING OILS

Original application filed July 2, 1926, Serial No. 120,067. Divided and this application filed April 17, 1929. Serial No. 355,754.

My invention relates to a method of heating fluids in tubular heaters and has special reference to the type of heating in which the fluid to be heated is passed in a series of parallel paths in radiative relation to a source of intensive heat.

This method of heating may be effected by passing the fluid, exemplified by oil in liquid or vapor phase, through a series of tubular elements which are subjected to intensive heat radiation from the flame produced by a burner. In this type of furnace it has been recognized that it is desirable to separate the radiant and convection heating effects in order to avoid the injurious effects of local overheating, and several means for obtaining this result have been proposed. So far as I am aware, however, none of the proposed methods result in a complete or substantially complete separation, and recourse is had to such expedients as shielding the tubes by a refractory substance or the like in order to avoid the effects of heat transfer by convection.

In the apparatus suitable for carrying out my invention, I secure a substantially complete separation of the radiant and convection heat without resort to the interposition of a refractory shield or the like between the source of heat and the tubes, the source of heat and the tubes being at all times in open communication. The nature of my apparatus furthermore, permits of an arrangement such that sagging of the tubes from the effects of heat is avoided, the tubes are readily removable for cleaning and the structure of the furnace is greatly cheapened and simplified.

This application is a division of my copending application, Serial No. 120,067, now U. S. Patent 1,717,334, improvement in furnaces, filed July 2, 1926.

The preferred embodiment of apparatus suitable for carrying out my invention consists of a furnace having two sections, a combustion chamber of substantially uniform cross section provided with tubes to absorb the heat of radiation only, and an economizer section where the products of combustion come into direct contact with a bank of heating elements placed in their path. I preferably construct my combustion chamber in cylindrical form, disposing the tubes vertically and supporting them from an upper tube sheet and arranging them so that they virtually line the inner surface of the combustion chamber. The products of combustion pass vertically through the center of the combustion chamber in a direction generally parallel to the plane of the tubes, radiating heat to the vertically disposed tubes but not transferring any substantial amount of heat thereto by contact since the bulk of the gases will not come in contact with them and the atmosphere immediately surrounding the tubes is substantially out of the flowing current of the products of combustion. Furthermore, the section of the passage through which the products of combustion flow is maintained substantially constant which tends to avoid turbulences in flow which might throw the hot gases against the tubes. The gases, having radiated heat to the vertical elements and consequently been reduced in temperature, then pass into the economizer section at such a temperature as to be substantially non-radiant. The hot gases here come in contact with and flow around a second group of heat absorbing tubes which are thus consequently adapted to absorb the convection component of the heat.

A feature of the invention is the annular arrangement of heat absorbing tubes within the combustion chamber permitting the flaming gases to pass vertically through the annular space formed by the tubes without impinging on the surfaces of the tubes, thus avoiding the necessity of shielding the tubes as heretofore practiced, such as, for instance, imbedding them in the wall and roof of the combustion chamber, or incasing them in heat resisting material.

When the vertically disposed tubes are arranged circularly about the source of heat and the path of the heated gases they form a protective lining or shield for the walls of the furnace, which consequently may be of lighter construction, and less heat will be lost by radiation through the walls, as they receive only a portion of the heat imparted to them in existing furnace designs.

The invention also provides other novel arrangements, such as a simple method of supporting the tubes, whereby they may be readily removed for renewal and accessible from both ends for cleaning.

The invention will best be understood if the following description is read in connection with the accompanying drawings, in which Figure 1 is a side elevation partially in section of a furnace according to my invention, showing a bottom-fired combustion chamber connected to an economizer section and the manner of vertically disposing the tubes in the combustion chamber;

Figure 2 is a detail plan view on a reduced scale of the upper tube sheet of the combustion chamber shown in Figure 1;

Figure 3 is a detail view showing the manner of mounting the tubes in the combustion chamber as shown in Figure 1;

Figure 4 is a detail perspective view of the lower casting giving access to the bottom of the tubes of the combustion chamber of Figure 1;

Figure 5 is a central longitudinal section through a modified form of my invention in which the combustion chamber is fired from the top, the products of combustion descending and passing through an underground flue into the economizer section;

Figure 6 is a detail view showing the manner of mounting the U-tubes used in the combustion chamber shown in Figure 5;

Figure 7 is a plan view partly in section on the line 7—7 of Figure 5, showing the manner in which the tube ends are connected; and Figure 8 is a detail plan view of the upper tube sheet of the combustion chamber shown in Figure 5.

In the embodiment of my invention shown in Figures 1 to 4, 10 represents a cylindrical combustion chamber built of brick work or other suitable material which may be held in shape merely by the circular bands 11. It will be understood that the combustion chamber may equally well be made somewhat conical or chimney-like in shape, and that this construction may be desirable with a high furnace as an aid to structural stability or for the purpose of modifying the section to allow for the change in volume of the products of combustion to maintain uniformity of flow. At the bottom of the combustion chamber a burner 12 or other source of heat is located inside the fire box 13, the sides of which extend well above the burner. At the top of the combustion chamber and extending down into the chamber is a flue or passageway 14 connecting the combustion chamber with the economizer section 15, in which is located a bank of tubes 16 preferably positioned horizontally at right angles to the path of the heated gases therethrough. Circularly arranged within the combustion chamber 10 adjacent the side wall but not in contact therewith are the vertically disposed tubes 17 supported from an upper tube sheet 18. The tubes so arranged form a surface virtually lining the side wall of the furnace and shielding it from the intense heat to which combustion chamber walls are ordinarily subjected. As shown in Figure 1, the tubes 17 extend well above the lower end of the flue 14 and below the top of the fire box 13. The hot products of combustion flowing up from the burner 12 pass through the center of the furnace, radiating heat to the annularly arranged tubes 17 but not transferring any substantial amount of heat to the tubes by contact since the tubes are situated out of the path of the gases.

The tops of the tubes extend through apertures 19 in the tube sheet 18 and the lower ends project into an annular casting 20 extending around the firebox, which holds the tubes in place and spaces them evenly in relation to one another. The casting 20 serves the function of a lower tube sheet, and is preferably formed in a plurality of arcuate sections open along their outer wall, as shown in Figure 4. Each section may be provided near each end with a strut 21, placed in such position that it will not interfere with the access to the tube headers. The tubes pass through apertures in the upper surface of the casting 20 into the chamber thus provided. The tubes are connected together in series by headers 22 located at their ends as shown in Figure 3. Ready access may be had to either end of the tubes by means of plugs 23 in the headers 22 for cleaning or otherwise.

As is usual in heating apparatus of this type, the oil or other liquid to be heated flows first through the tubes 16 of the economizer section 15 and then through the tubes 17 of the combustion chamber 10. Preferably the oil in the economizer section flows counter-current to the flow of the products of combustion, entering the lowest tube 16 of the economizer section and flowing upwardly through the tubes 16 connected in series, the final tube 16 being connected to the upper end of one of the tubes 17 in the combustion chamber 10. The alternate ends of the tubes 17 are connected by headers as shown in Figure 3, and the heated oil or other liquid flows downwardly through the first tube 17, then upwardly through the next tube, and so on until it has completely gone around the circle formed by the tubes 17, being discharged from the final tube.

It will be noted that the lower end of the flue 14 extends below the upper tube sheet 18 and that the upper end of the fire box 13 extends above the lower casting 20, forming shoulders behind which gas pockets are formed, thereby tending to prevent the entrance of the flame into these corners and consequent erosion of the tubes at these points. These shoulders also serve to keep the flame somewhat centered and away from the tubes during its vertical travel.

It will be seen that the ends of the tubes and the headers connecting them are protected from the flame by being housed outside of the heating zone.

In the embodiment of my invention shown in Figure 5, which will be described only in so far as it differs from that shown in Figure 1, the combustion chamber 25 is fired from the top by a burner 26. In this modification the connecting flue 27 is located below the combustion chamber 25 and the economizer 28, and it is possible to support the tubes in the combustion chamber in such a manner that when in need of cleaning, a tube may be readily removed and a clean tube substituted, thus reducing the idle time of the equipment. In order to accomplish this a somewhat different construction of the tubes is used. A number of U-shaped tubes 30 are arranged in the combustion chamber as before, and are supported from an upper tube sheet 31, which is provided with slots 32 as shown in Figure 8, to permit the U-tubes to be inserted therethrough. A separate flame plate 33 is placed over each slot 32 and supported on the top of the tube plate 31, and is provided with two apertures to accommodate the ends of the tube 30. The U-tubes 30 are connected together by return bends 34 which are joined to the tubes by unions 35. In this manner the tubes are held in place only by their own weight and are free to expand or contract as they vary in temperature.

A furnace constructed in accordance with my invention effectually distributes the work done by the heating surfaces and to a large extent reduces the possibility of over-heating of elements which would be detrimental either to the surfaces thus attacked or to the fluid being heated and flowing within the tubes. As will be seen, this is accomplished by absorbing heat by radiation from the flame until the products of combustion have been so reduced in temperature that they can be safely put into contact with the usual form of heating elements. It is, of course, desirable to burn fuel with the least amount of excess air possible, which always results in a high fire box temperature which is detrimental to the walls of the combustion chamber and to the first elements with which the products of combustion come into contact.

By absorbing the radiant heat from the intense flame caused by burning fuel under proper conditions, the temperature of the products of combustion passing out of the combustion chamber is reduced efficiently by transferring the portion of the heat that can be withdrawn by radiation and making it perform useful work. The transfer rate on the first contact elements is thus reduced to a safe limit, at the same time permitting efficient combustion of the fuel without the necessity of admitting excess air.

By disposing the tubes vertically, it will be noted that the section at right angles to the path of the hot gases is substantially uniform, tending to permit a smooth flow and to avoid the forming of eddies around the tubes which would cause a transfer of heat by contact. If the tubes were disposed horizontally around the path of the flame, the difference in the area of sections, taken between the tubes and through the tubes, would tend to cause a turbulence in the flow of the hot gases which is undesirable for the above reasons. Thus, the disposing of tubes vertically not only adds to the structural merit of the furnace by avoiding sagging of the tubes, but is an important factor in eliminating heat transfer by contact with the radiant heat elements.

The circular form of the combustion chamber and the shielding of the wall by the heat elements reduces the costs of construction by utilizing a stable form of structure and permitting the use of lighter walls.

The steel work required to hold the combustion chamber together is largely reduced over furnaces of rectangular sections and the necessity of using arches and roof sections is avoided.

It will be obvious that changes can be made in the design and that the combustion chamber can be built rectangular in cross section without departing from my invention, although the combustion chamber is preferably made circular in form for the above reasons and this circular form is distinctly an improvement on the existing practice.

In the invention shown by the drawings, one row of tubes has been indicated in the combustion chamber. This, however, is primarily for the purpose of illustration and I contemplate, when necessary, using two or more rows, preferably in staggered relationship, which may be desirable to absorb as much of the radiant heat as possible, and furthermore, the combustion chamber and the economizer sections may be constructed one above the other if desired, although the indicated arrangement is preferred for structural reasons.

What I claim is:

1. The method of quickly raising oil to a desired temperature, which comprises burning a fuel to create a flame as a source of intensive radiant heat and impelling the flame and the products of combustion in a vertical unobstructed path, and passing the oil in radiative relation to the flame and the hot combustion products serially through vertical paths which are parallel to the path of the flame and products of combustion and substantially equidistant therefrom, to quickly absorb radiant heat and reduce the temperature of the products of combustion, while maintaining the products of combustion in substantially non-convective relation to said paths.

2. The method of heating a medium to a desired temperature, which comprises burning a fuel to create a flame as a source of intensive radiant heat and impelling the flame and the products of combustion in a vertical unobstructed path, and passing the medium in radiative relation to the flame and the hot combustion products serially through vertical paths which are parallel to the path of the flame and products of combustion and substantially equidistant therefrom, to quickly absorb radiant heat and reduce the temperature of the products of combustion, while maintaining the products of combustion in substantially non-convective relation to said paths.

In witness whereof I have hereunto set my hand this 1st day of April, 1929.

LUIS DE FLOREZ.